(12) United States Patent
Bernard et al.

(10) Patent No.: US 10,234,025 B2
(45) Date of Patent: Mar. 19, 2019

(54) METHOD FOR CONTROLLING A ROTATING ELECTRICAL MACHINE ON CHANGING FROM MODULATION OF THE FULL-WAVE TYPE TO PULSE-WIDTH MODULATION

(71) Applicant: Valeo Equipements Electriques Moteur, Creteil (FR)

(72) Inventors: François-Xavier Bernard, Créteil (FR); Gilbert Konan, Créteil (FR); Joachim Laupa, Créteil (FR)

(73) Assignee: Valeo Equipements Electriques Moteur, Creteil (FR)

( * ) Notice: Subject to any disclaimer, the term of this patent is extended or adjusted under 35 U.S.C. 154(b) by 0 days.

(21) Appl. No.: 15/890,896

(22) Filed: Feb. 7, 2018

(65) Prior Publication Data
US 2018/0223989 A1 Aug. 9, 2018

(30) Foreign Application Priority Data

Feb. 9, 2017 (FR) ...................................... 17 51077

(51) Int. Cl.
*G05B 11/28* (2006.01)
*F16H 61/02* (2006.01)
(Continued)

(52) U.S. Cl.
CPC ....... *F16H 61/0251* (2013.01); *F16D 48/064* (2013.01); *G06F 9/06* (2013.01);
(Continued)

(58) Field of Classification Search
CPC ...... H02P 1/00; H02P 1/04; H02P 1/24; H02P 1/26; H02P 1/42; H02P 1/423; H02P 1/46; H02P 4/00; H02P 5/00; H02P 5/50; H02P 5/69; H02P 5/695; H02P 5/753; H02P 6/04; H02P 6/06; H02P 6/08; H02P 7/29; H02P 7/2885; H02P 27/04; H02P 27/06; H02P 23/00; H02P 25/00; H02P 27/00;
(Continued)

(56) References Cited

U.S. PATENT DOCUMENTS 6,694,834 B2 * 2/2004 Bansbach ............... F16H 61/32
192/84.6
7,960,930 B2 * 6/2011 Sato ...................... B60L 15/025
318/432
(Continued)

FOREIGN PATENT DOCUMENTS

FR 2895597 A1 6/2007
JP 2012-244740 A 12/2012

*Primary Examiner* — Antony M Paul
(74) *Attorney, Agent, or Firm* — Osha Liang LLP

(57) ABSTRACT

The invention mainly relates to a method for controlling a rotating electrical machine (7) interacting with a motor vehicle gearbox (1), characterized in that, during a phase of synchronization between two speed ratios (R1-Rn) during which the rotating electrical machine (7) is controlled for speed and there is a change of the type of modulation with transition from modulation of the full-wave type (FW) to pulse-width modulation (PWM), said method comprises a control step with the aim of limiting the variations of an output current of an inverter during the phase of change of the type of modulation without compensation of torque variations.

8 Claims, 4 Drawing Sheets

(51) Int. Cl.
- *H02M 7/5395* (2006.01)
- *G06F 9/06* (2006.01)
- *F16D 48/06* (2006.01)
- *H02P 21/00* (2016.01)
- *H02P 21/05* (2006.01)

(52) U.S. Cl.
CPC ...... *H02M 7/5395* (2013.01); *H02P 21/0089* (2013.01); *H02P 21/05* (2013.01); *F16H 2061/0255* (2013.01); *H02P 2209/13* (2013.01)

(58) Field of Classification Search
CPC ........ G05B 11/28; H02K 29/08; H02K 19/12; F16H 61/0251; H02M 7/5395
USPC .......... 318/400.01, 700, 701, 705, 779, 799, 318/599, 800, 801, 430, 432, 437; 388/800, 811, 819; 903/917; 74/393; 474/69; 475/80, 185
See application file for complete search history.

(56) References Cited

U.S. PATENT DOCUMENTS

| | | | |
|---|---|---|---|
| 9,166,511 B2 * | 10/2015 | Morii | H02P 21/0085 |
| 2009/0237013 A1 | 9/2009 | Sato | |
| 2011/0241584 A1 | 10/2011 | He et al. | |
| 2015/0096863 A1 | 4/2015 | Maurel et al. | |

\* cited by examiner

METHOD FOR CONTROLLING A ROTATING ELECTRICAL MACHINE ON CHANGING FROM MODULATION OF THE FULL-WAVE TYPE TO PULSE-WIDTH MODULATION

The present invention relates to a method for controlling a rotating electrical machine on changing from modulation of the full-wave type to pulse-width modulation. The invention finds particularly advantageous, but not exclusive, application with high-power electrical machines operating notably on a motor vehicle electrical system, for example the 48 V system.

In certain types of motor vehicle powertrains providing transmission of the mechanical power of the heat engine to the wheels of the vehicle, a high-power reversible rotating electrical machine may be coupled to a gearbox, for example of the dual-clutch type.

The electrical machine is able to operate in alternator mode notably to supply energy to the battery and to the vehicle electrical system, and in motor mode, not only to provide starting of the heat engine, but also to participate in traction of the vehicle, alone or in combination with the heat engine. Furthermore, speed control of the electrical machine is used notably for effecting synchronization between the gears on the shafts of the gearbox at the moment of a change of ratio.

During the phase of synchronization between two speed ratios, there may be a change of the type of modulation of the electrical machine. In fact, the electrical machine is controllable according to a so-called full-wave (FW) mode, according to which the switching devices of the inverter of the machine are controlled by sequences of square signals supplied by a control unit. The inverter may also be controlled in pulse-width modulation, commonly called PWM, to obtain precise control of the electrical machine in each particular operating condition. Examples of PWM commands generated by a microprocessor are described in document FR2895597.

The change from one mode to the other depends notably on the rotary speed of the machine. Thus, FIG. 1 illustrates the change from PWM mode to full-wave when the speed of the electrical machine Vmel exceeds a threshold S1 at the time point t1, as well as the change from full-wave mode to PWM mode when the speed of the electrical machine goes below a threshold S2 at the time point t2. The thresholds S1 and S2 may be different to avoid untimely changes of mode.

During transition from PWM mode to full-wave, the modulations change from "vectorial" to "scalar". The technique used during this transition consists of over-modulating the voltage vector. For this, the amplitude of this vector must be increased gradually starting from an invertible voltage of the PWM type to an invertible voltage of the full-wave type, while maintaining the torque required by control via the quadrature current.

This transition may take between some tens of milliseconds and about a hundred milliseconds to limit the variations in currents due to the increase of the vector. The choice of the voltage gradient may result from:
- a time delay: the transition then takes place in an allotted time,
- a fixed gradient: as the voltage gradient is fixed, the transition time may vary as a function of the initial voltage,
- or a combination of these two criteria.

In full-wave mode, it is not possible to control the current vector directly, but just one of its components. The direct current set-point Id calculated in real time is not taken into account during this control phase. As is illustrated in FIG. 2, at the moment of transition from full-wave modulation to PWM, the measured direct current Id_r must converge to its set-point Id_cons in an allotted time. During this convergence time, the uncontrolled variation of current leads to a peak P of the direct current Ibatt on the vehicle electrical system, which generates a voltage peak that may exceed the limits permitted by the control electronics of the vehicle's energy storage device.

The present invention aims to overcome this drawback in an effective manner by proposing a method for controlling a rotating electrical machine, interacting with a motor vehicle gearbox, characterized in that, during a phase of synchronization between two speed ratios during which the rotating electrical machine is controlled for speed and there is a change in the type of modulation, with transition from modulation of the full-wave type to pulse-width modulation;

said method comprises a control step with the aim of limiting the variations of an output current of an inverter during the phase of change of the type of modulation without compensation of torque variations.

The invention thus makes it possible to remain within the voltage limits permitted by the control electronics of the vehicle's energy storage device.

According to one embodiment, said method comprises:
- a step of application, during a transition period, of a set-point of pre-field weakening current equal to a measurement of direct axis current, and
- a step of convergence to a set-point of pre-field weakening current over a convergence time.

According to one embodiment, the convergence time is less than a refresh period of the set-point of current.

According to one embodiment, the convergence time is approximately equal to or greater than half the refresh period of the set-point of current.

According to one embodiment, the convergence time is between 100 microseconds and 5 milliseconds.

According to one embodiment, the convergence time is of the order of 2.5 ms.

According to another aspect, the invention relates to a control module of a rotating electrical machine comprising a memory that stores software instructions for implementing the method as defined above.

According to another aspect, the invention relates to a rotating electrical machine comprising a control module as defined above.

The invention will be better understood on reading the following description and on examining the accompanying figures. These figures are only given for purposes of illustration and do not in any way limit the invention.

FIG. 1, already described, is a graphical representation illustrating the change in type of modulation (full-wave or PWM) as a function of the rotary speed of the rotating electrical machine;

FIG. 2, already described, is a graphical representation illustrating the battery current peak observable on changing from modulation of the full-wave type to modulation of the PWM type;

Figure 1:
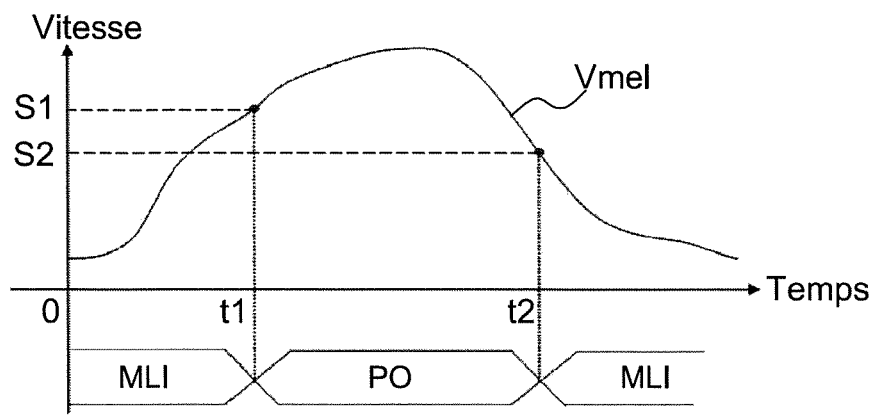
Figure 2:
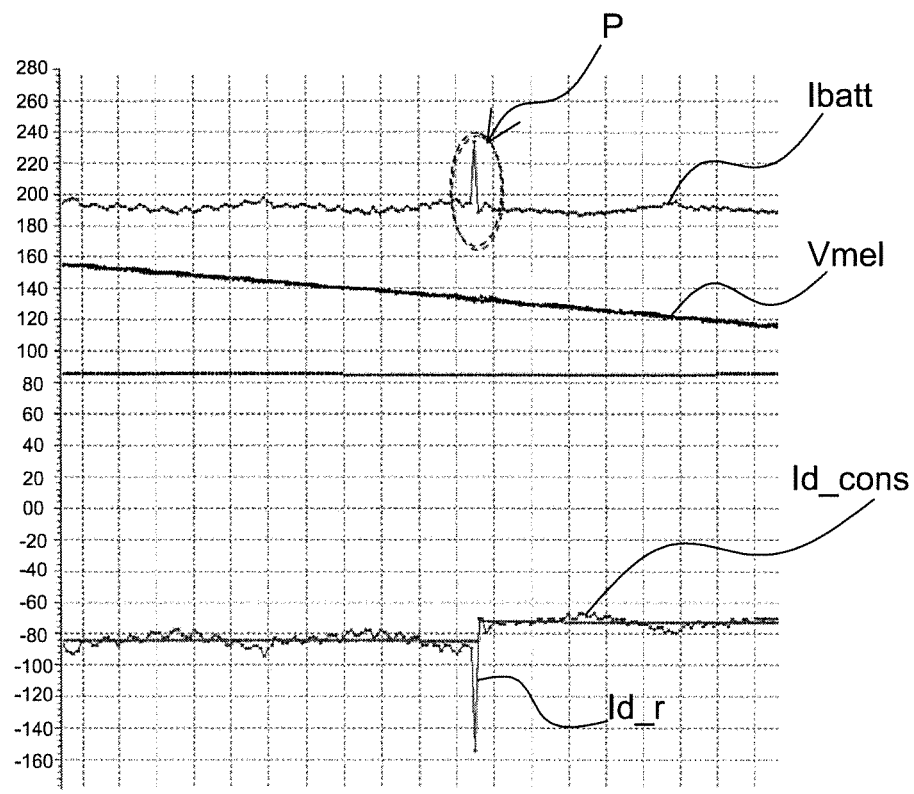
Figure 3:
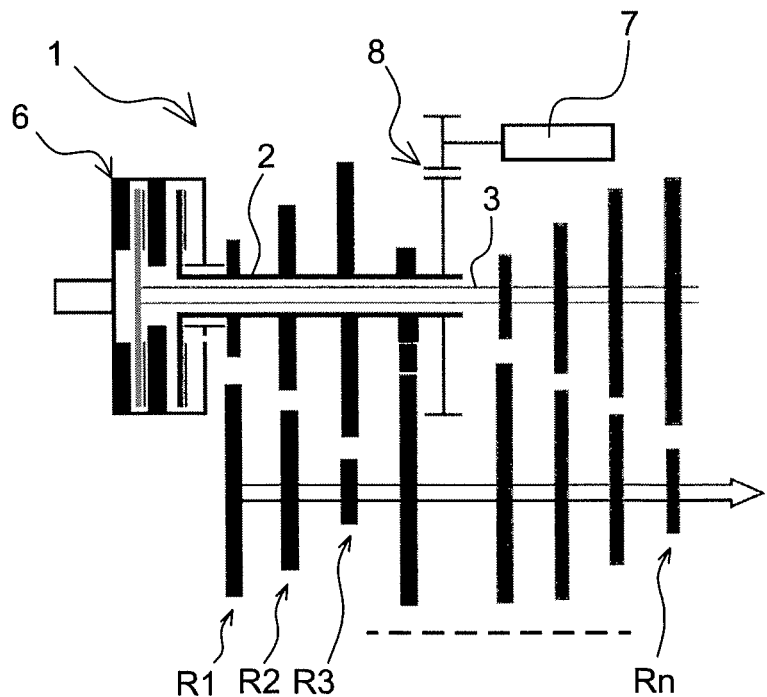
FIG. 3 is a schematic representation of an assembly comprising a rotating electrical machine according to the invention coupled to a dual-clutch gearbox.

As is illustrated in FIG. 3, a gearbox 1 comprises a plurality of speed ratios R1-Rn. A first shaft 2 is associated with odd speed ratios and a second shaft 3 is associated with even speed ratios. A dual-clutch system 6 makes it possible to link in rotation or release these shafts 2, 3 depending on the ratio selected.

A rotating electrical machine 7 is coupled to the gearbox 1 via a speed reducer 8. The electrical machine 7 will be mountable inside or outside the gearbox 1.

The electrical machine 7 is able to operate in alternator mode notably to supply energy to the battery and to the vehicle's electrical system 10, and in motor mode, not only to provide starting of the heat engine, but also to participate in traction of the vehicle, alone or in combination with the heat engine.

The speed control of the electrical machine 7 is used notably for effecting synchronization between the gears of shafts 2, 3 of the gearbox 1 at the moment of a change of speed ratio R1-Rn.

Figure 4:
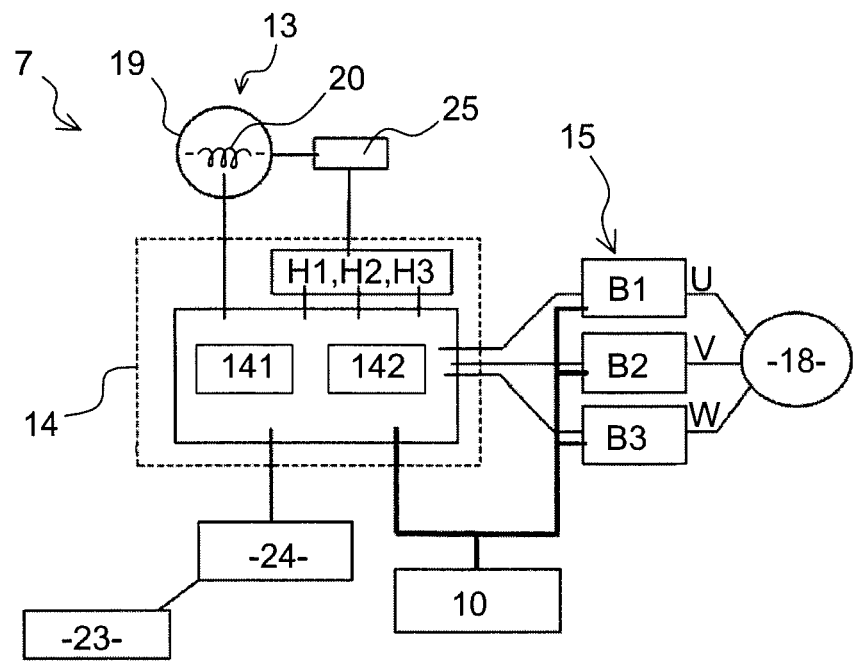
FIG. 4 is a functional schematic representation of the rotating electrical machine employing the method of control according to the present invention.

More precisely, as is shown in FIG. 4, the electrical machine 7 is connected to the vehicle electrical system 10. The vehicle electrical system 10 preferably has a voltage of 48V. As a variant, the vehicle electrical system 10 has a voltage of 12V or 24V.

The starter-generator 7 notably comprises an electromechanical part 13, a control module 14, and an inverter 15. The electromechanical part 13 comprises an induced element 18, and an inducing element 19. In one example, the induced element 18 is the stator, and the inducing element 19 is a rotor comprising an exciting coil 20. The stator 18 comprises any number N of phases. The phases of the stator 18 can have delta or star connection. A combination of delta and star connection is also conceivable.

The control module 14 comprises an exciting circuit 141, known per se, generating an exciting current that is injected into the exciting coil 20.

The control module 14 further comprises a control circuit 142, comprising for example a microcontroller, which controls the inverter 15 as a function of a command signal from the engine management computer 23 and received via a signal connector 24. The control module 14 comprises a memory that stores software instructions for implementing the method for controlling the electrical machine 7 described hereunder.

The inverter 15 comprises a plurality of arms B1, B2, B3 each having two switching devices, for example transistors of the MOS type, for connecting the phases u, v, w to a positive potential of the vehicle electrical system 10 or to earth, depending on the angular position of the rotor 19.

The angular position and the angular speed of the rotor 19 can be measured by means of Hall-effect analogue sensors H1, H2, H3 and an associated magnetic target 25 which is integral with rotation of the rotor 19.

During the phase of synchronization between two speed ratios, the type of modulation of the rotating electrical machine 7 may change. In fact, the electrical machine 7 is controllable according to a so-called full-wave mode (FW) according to which the switching devices of the inverter 15 of the machine are controlled by sequences of square signals supplied by a control unit. The inverter 15 may also be controlled in pulse-width modulation, commonly called PWM, to obtain precise control of the electrical machine 7 in each particular operating condition. Examples of PWM commands generated by a microprocessor are described in document FR2895597.

The method according to the invention comprises a control step with the aim of limiting the variations of an output current Idc of the inverter 15 during the phase of change of the type of modulation (full-wave to PWM) without compensation of torque variations.

Figure 5:
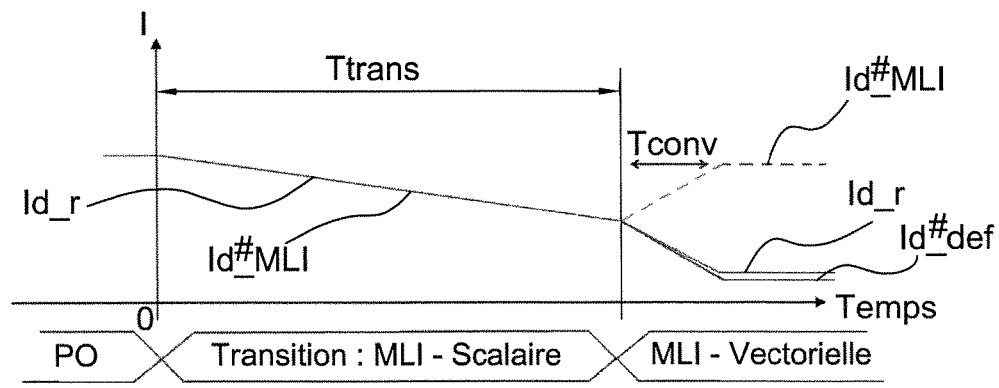
FIG. 5 is a graphical representation of the time-dependent variation of the actual current, of the pre-field weakening current, and of the field weakening current observable during transition from a full-wave mode to a PWM mode employing the control strategy according to the invention.

For this purpose, as illustrated in FIG. 5, the control module 14 controls the application, during a transition period Ttrans between the two modes, of a set-point of pre-field weakening current Id#_PWM equal to a measurement of direct axis current Id_r. Then we observe convergence to the set-point of pre-field weakening Id#_PWM over a convergence time Tconv. Once the transition is complete, the field weakening loop of set-point Id#_def ensures that it is kept under voltage.

It should be noted that the set-point of pre-field weakening Id#_PWM is a set-point of direct axis current corresponding to an operating point of the electrical machine 7 for a given modelling. The set-point of field weakening Id#_def corresponds to the set-point of direct axis current to which a variation of current is added, taking into account modelling errors as well as physical errors connected with the operation of the rotating electrical machine 7.

The convergence time Tconv is less than a refresh period of the set-point of direct axis current Id#_PWM. The convergence time Tconv is approximately equal to or greater than half the refresh period of the set-point of direct axis current Id#_PWM. The convergence time Tconv is between 100 microseconds and 5 milliseconds, and is preferably of the order of 2.5 ms.

Thus, in full-wave mode, neither the direct current set-point, nor the field weakening loop are used, as the current in this axis is the consequence of the voltage vector.

During transition from the full-wave mode to the PWM-Scalar mode, the field weakening current Id#_def is still fixed by the voltage vector. As the invertible voltage decreases, the field weakening current increases. During this phase, which extends over the duration Trans, the set-point of Id#_PWM may be considered to be equal to the measurement Id_r.

At the end of this transition, i.e. at the moment of transition from control of the scalar type to control of the vectorial type, it is necessary for the measurement of the current Id_r to be close to the set-point so that convergence takes place quickly.

Return to a vectorial PWM mode takes place flexibly, as the end point of the Scalar PWM and that of the vectorial PWM must be relatively close to one another. For this purpose, the set-point of pre-field weakening Id#_PWM, which was equal to the measurement, just before the change of modulation, converges on the period Tconv that is less than its refresh period.

Figure 6A:
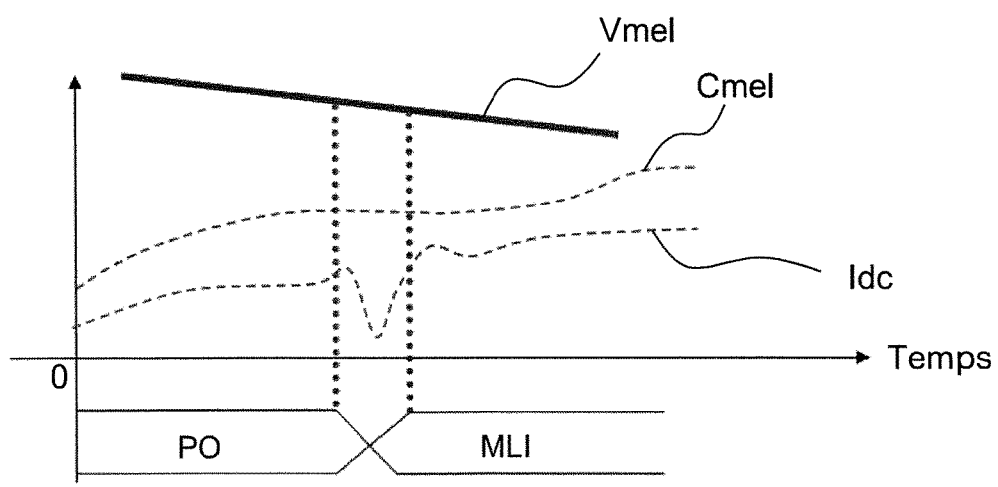
FIGS. 6a and 6b are graphical representations of the time-dependent variation of the rotary speed, torque, and output current of the rotating electrical machine respectively when employing a strategy according to the prior art and according to the invention.

As illustrated in FIG. 6a, the change from full-wave mode to PWM effected at constant torque Cmel in the known control strategies gives rise to variations of current Idc at the output of the inverter 15 connected to the electrical machine 7 and therefore variations of voltage at the battery terminals.

Figure 6B:
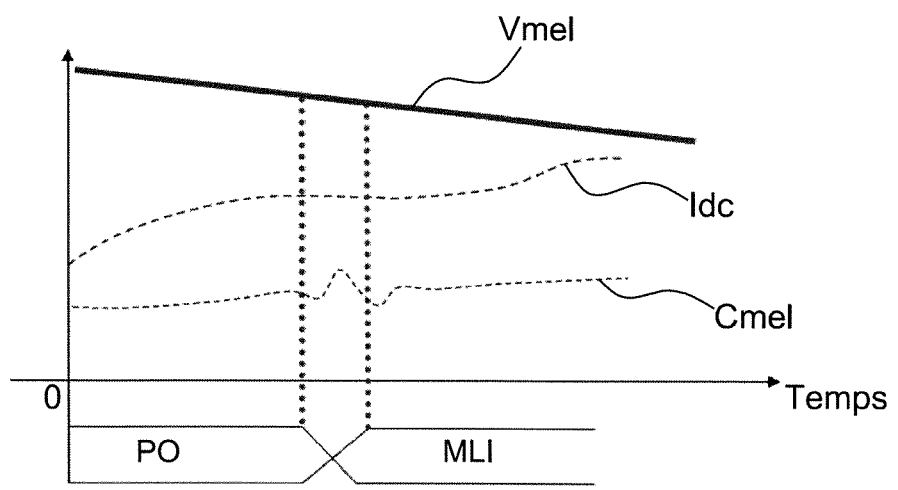

As illustrated in FIG. 6b, control of the electrical machine 7 following the strategy according to the invention gives rise to the small torque variations Cmel but makes it possible, by keeping the current Idc roughly constant, to attenuate the current excesses that could be harmful to the operation of the vehicle's energy storage device.

Of course, the foregoing description has been given purely as an example and does not limit the scope of the invention; moreover, replacing the various elements with any other equivalent elements will remain within the scope of the invention.

Furthermore, the various features, variants, and/or embodiments of the present invention may be combined with one another in various combinations, provided that they are not incompatible or mutually exclusive.

The invention claimed is:

1. A method for controlling a rotating electrical machine interacting with a motor vehicle gearbox, comprising:
during a phase of synchronization between two speed ratios during which the rotating electrical machine is controlled for speed and there is change of the type of modulation with transition from modulation of the full-wave type to pulse-width modulation, limiting the variations of an output current Ode) of an inverter during the phase of change of the type of modulation without compensation of torque variations.

2. The method according to claim 1, further comprising:
application, during a transition period, of a set-point of pre-field weakening current equal to a measurement of direct axis current; and
convergence to a set-point of pre-field weakening current over a convergence time.

3. The method according to claim 2, wherein the convergence time is less than a refresh period of the set-point of current.

4. The method according to claim 3, wherein the convergence time is approximately equal to or greater than half the refresh period of the set-point of current.

5. The method according to claim 1, wherein the convergence time is between 100 microseconds and 5 milliseconds.

6. The method according to claim 5, wherein the convergence time is of the order of 2.5 ms.

7. A control module of a rotating electrical machine comprising a memory that stores software instructions for implementing the method as defined according to claim 1.

8. A rotating electrical machine comprising a control module as defined according to claim 7.

* * * * *

UNITED STATES PATENT AND TRADEMARK OFFICE
CERTIFICATE OF CORRECTION

PATENT NO. : 10,234,025 B2
APPLICATION NO. : 15/890896
DATED : March 19, 2019
INVENTOR(S) : François-xavier Bernard et al.

Page 1 of 1

It is certified that error appears in the above-identified patent and that said Letters Patent is hereby corrected as shown below:

In the Claims

At Column 5, Claim number 1, Line number 20, the word "Ode)" should be omitted.

Signed and Sealed this
Eighth Day of October, 2019

Andrei Iancu
*Director of the United States Patent and Trademark Office*